(12) United States Patent
Duplys et al.

(10) Patent No.: US 12,316,705 B2
(45) Date of Patent: May 27, 2025

(54) NEGATIVE LIST-BASED RECOGNITION/PREVENTION OF INTRUSION INTO A SERVICE-ORIENTED COMMUNICATION SYSTEM

(71) Applicant: Robert Bosch GmbH, Stuttgart (DE)

(72) Inventors: Paulius Duplys, Markgroeningen (DE); Tobias Gehrmann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/821,163

(22) Filed: Aug. 19, 2022

(65) Prior Publication Data

US 2023/0060741 A1 Mar. 2, 2023

(30) Foreign Application Priority Data

Aug. 25, 2021 (DE) .................. 10 2021 209 320.5

(51) Int. Cl.
*H04L 67/12* (2022.01)
*G07C 5/08* (2006.01)

(52) U.S. Cl.
CPC ............ *H04L 67/12* (2013.01); *G07C 5/0816* (2013.01)

(58) Field of Classification Search
CPC ..... H04L 63/0245; H04L 63/04; H04L 63/14; H04L 67/12; H04L 63/20; H04L 63/1408; H04L 63/1425; H04L 63/1441; H04L 63/0236; H04L 63/1416; H04L 63/1433; G07C 5/0816; B60R 16/023; H04B 1/3822; G06F 21/55; G06F 2221/2119; G06F 8/61; G06F 16/1873; G06F 16/2329; G06F 21/00; G06F 2212/1052; G06F 16/2246; G06F 16/9027; G06F 16/322

See application file for complete search history.

(56) References Cited

U.S. PATENT DOCUMENTS

| 9,870,431 | B2 * | 1/2018 | Hammen | G06F 16/9027 |
|---|---|---|---|---|
| 10,853,058 | B1 * | 12/2020 | Ouzan | G06F 8/71 |
| 2007/0011116 | A1 * | 1/2007 | Vauclair | G06F 21/31 706/16 |
| 2009/0293102 | A1 * | 11/2009 | Klein | H04L 63/0281 726/2 |
| 2011/0055055 | A1 * | 3/2011 | Du | G06Q 10/10 705/30 |

(Continued)

*Primary Examiner* — Tonia L Dollinger
*Assistant Examiner* — Linh T. Nguyen
(74) *Attorney, Agent, or Firm* — NORTON ROSE FULBRIGHT US LLP

(57) ABSTRACT

A computer-implemented method for recognizing and/or preventing an intrusion into a service-oriented communication system of a vehicle, including registering a process originating from an instance in the service-oriented communication system, and checking, at least based on a predetermined negative list, whether the process in the service-oriented communication system is impermissible. A service-oriented communication system in a vehicle, which is designed to apply the method for recognizing and/or preventing an intrusion into the service-oriented communication system, optionally the communication system being safeguarded via the method for recognizing and/or preventing an intrusion into the service-oriented communication system.

10 Claims, 2 Drawing Sheets

(56) References Cited

U.S. PATENT DOCUMENTS

| | | | |
|---|---|---|---|
| 2013/0159717 A1* | 6/2013 | Rabadi | H04L 9/30 713/176 |
| 2013/0212680 A1* | 8/2013 | Winn | H04L 51/212 726/23 |
| 2014/0033295 A1* | 1/2014 | Batke | H04L 63/0254 726/13 |
| 2014/0173712 A1* | 6/2014 | Ferdinand | H04L 63/0236 726/11 |
| 2015/0281262 A1* | 10/2015 | Cai | H04L 63/1408 726/23 |
| 2016/0381042 A1* | 12/2016 | Zhang | H04L 63/1416 726/24 |
| 2017/0091484 A1* | 3/2017 | Lee | G06F 16/951 |
| 2018/0032368 A1* | 2/2018 | Choi | G06F 9/485 |
| 2018/0041471 A1* | 2/2018 | Sudo | H04L 63/1416 |
| 2019/0297056 A1* | 9/2019 | Chiang | H04L 63/1466 |
| 2020/0076771 A1* | 3/2020 | Maier | H04L 63/0407 |
| 2020/0304525 A1* | 9/2020 | Siev | H04L 63/101 |
| 2021/0014341 A1* | 1/2021 | Weber | H04L 69/04 |
| 2021/0075807 A1* | 3/2021 | Park | H04W 4/48 |
| 2021/0084464 A1* | 3/2021 | Watanabe | H04L 12/40026 |
| 2021/0103449 A1* | 4/2021 | Terpstra | H04L 63/102 |
| 2021/0160315 A1* | 5/2021 | Linn-Moran | H04L 67/562 |
| 2021/0192867 A1* | 6/2021 | Fang | G07C 5/0816 |
| 2022/0131877 A1* | 4/2022 | Oest | H04L 63/145 |
| 2022/0201039 A1* | 6/2022 | Risso | H04L 63/164 |
| 2022/0230249 A1* | 7/2022 | Klingsberg | G06F 8/4441 |
| 2022/0385553 A1* | 12/2022 | Adachi | H04L 12/4625 |
| 2023/0068045 A1* | 3/2023 | Colon | B60R 25/24 |

\* cited by examiner

NEGATIVE LIST-BASED RECOGNITION/PREVENTION OF INTRUSION INTO A SERVICE-ORIENTED COMMUNICATION SYSTEM

CROSS REFERENCE

The present application claims the benefit under 35 U.S.C. § 119 of German Patent Application No. DE 10 2021 209 320.5 filed on Aug. 25, 2021, which is expressly incorporated herein by reference in its entirety.

BACKGROUND INFORMATION

Service-oriented communication systems are increasingly used in vehicles. In contrast to, for example, signal-based communication systems, such as, for example, CAN bus systems, which are essentially statically defined during a development phase, service-oriented communication systems are designed to be dynamically adapted and/or expanded during operation of the vehicle. In the process, the interaction between instances of the service-oriented communication system, such as, e.g., electronic control units of the vehicle (i.e., ECUs), may be dynamically mapped by services, and, in particular, during operation of the vehicle. For example, one instance in the service-oriented communication system may publish a service, and thus offer it to other instances of the service-oriented communication system. Furthermore, for example, one instance in the service-oriented communication system may retrieve (subscribe to) a service in another instance of the service-oriented communication system. Via the publication and/or retrieval of services, it is also possible to at least temporarily integrate external control units and/or electronic devices which do not form part of the hardware of the vehicle into the service-oriented communication system. Such an electronic device may, in particular, also be a smart phone of a user of the vehicle who, for example, wants to play music from his or her smart phone via the multimedia device of the vehicle.

Scalable service-Oriented MiddlewarE over IP (SOME/IP) is a standard for an IP-based service-oriented communication in vehicles. This middleware (also: intermediate application or service layer) is situated on layers 5 through 7 of the standard ISO/OSI communication layer model and uses either TCP or UDP as underlying transport protocols. SOME/IP enables applications on instances of the service-oriented communication system to communicate with one another, without having knowledge of the specific instance on which the particular application is running. SOME/IP has been an integral part of AUTOSAR since AUTOSAR version 4.0.

In addition to the above-described functionalities of publishing and/or retrieving services, SOME/IP, for example, includes a functionality for the recognition of services (service discovery, SOME/IP-SD), which allows instances in the service-oriented communication system to dynamically find services in the service-oriented communication system and obtain their associated IP addresses and port numbers, via which the services may be retrieved. Moreover, SOME/IP offers a functionality for remote procedure calls (RPCs). During a remote procedure call, an instance of the service-oriented communication system may call up a function on another instance (i.e., a remote function/procedure) in such a way that the function is executed on the other instance, and potential return values of the function are transferred via the service-oriented communication system to the calling instance of the service-oriented communication system.

The increasing complexity and interconnectivity of modern vehicles results in an ever larger attack surface for a potential intrusion into the service-oriented communication system. Present or conventional versions of SOME/IP do not include any security mechanisms for safeguarding against intrusion.

SUMMARY

A first general aspect of the present invention relates to a computer-implemented method for recognizing and/or preventing an intrusion into a service-oriented communication system of a vehicle. According to an example embodiment of the present invention, the method includes registering a process originating from an instance in the service-oriented communication system. The method furthermore includes checking, at least based on a predetermined negative list, whether the process in the service-oriented communication system is impermissible. The method may furthermore include initiating at least one measure at least as a function of a result of the check and, optionally, based on a predetermined measure algorithm. The initiation of the at least one measure may include suppressing the process when the check has shown that the process is impermissible. The initiation of the at least one measure may furthermore include allowing the process when the check has shown that the process is not impermissible.

A second general aspect of the present invention relates to a service-oriented communication system in a vehicle, which is designed to apply the method for recognizing and/or preventing an intrusion into the service-oriented communication system according to the first general aspect (or a specific embodiment thereof). According to an example embodiment of the present invention, the communication system may furthermore be safeguarded with the aid of the method for recognizing and/or preventing an intrusion into the service-oriented communication system according to the first general aspect (or one specific embodiment thereof).

A third general aspect of the present invention relates to a vehicle which includes the service-oriented communication system according to the second general aspect (or one specific embodiment thereof).

A fourth general aspect of the present invention relates to a computer program, which is designed to execute the computer-implemented method for recognizing and/or preventing an intrusion into a service-oriented communication system according to the first general aspect (or a specific embodiment thereof).

A fifth general aspect of the present invention relates to a computer-readable medium or signal which the computer program according to the fourth general aspect (or one specific embodiment thereof) stores and/or contains.

A sixth general aspect of the present invention relates to a computer system which is designed to execute the computer program according to the fourth general aspect (or one specific embodiment thereof).

Due to the dynamic variability, service-oriented communication systems, in particular, SOME/IP, offer an increasingly larger attack surface for impermissible and undesirable intrusion. Such an intrusion may entail a damage or even harm in various respects. In a bad case, the intrusion may even impair the driving safety of the vehicle. As a result, methods and/or devices are to be found, which effectively recognize an intrusion and/or intrusion attempts into the service-oriented communication system and initiate at least one measure, for example, a counter-measure, when a process is assessed as an intrusion. In the process, however, the dynamic variability of the service-oriented communication is not to be limited.

This problem is solved by the method, according to the present invention, for recognizing and/or preventing an intrusion into a service-oriented communication system of a vehicle according to the first general aspect (or one specific embodiment thereof) and the service-oriented communication system according to the second general aspect (or one specific embodiment thereof).

In conventional safeguardings of service-oriented communication systems, in particular, of SOME/IP, the check as to whether a process in the service-oriented communication system is permissible takes place based on a predetermined positive list. Such a positive list is necessarily very limiting since processes in the service-oriented communication system are exclusively permissible when they are explicitly provided in the positive list. The method, as described in the present invention, for recognizing and/or preventing an intrusion into a service-oriented communication system of a vehicle according to the first general aspect (or one specific embodiment thereof), in contrast, is based on the check based on a negative list. Here, processes are only assessed as impermissible when the process is not permissible based on the negative list. In this way, an assessment of the permissibility based on a negative list is less limiting than an assessment of the permissibility based on a positive list. This may be advantageous insofar as, in the case of an assessment based on a negative list, a safeguarding against an intrusion into the service-oriented communication system is achieved, during which the dynamic variability of the service-oriented communication system is limited less.

The dynamic variability of the service-oriented communication system may be further enhanced by an update functionality of the service-oriented communication system. For example, the negative list and/or a measure algorithm may be updated via an interface of the service-oriented communication system by a server in a secure manner (e.g., via end-to-end encryption and digital signatures). Thanks to the update functionality, new findings and connections which, in particular, may not yet be known at the point of time of the development, may be taken into consideration during the check for intrusion.

The interface of the service-oriented communication system may furthermore be used to carry out a subsequent, possibly more complex, check outside of the vehicle, i.e., on the server. In addition to a more computationally intensive check, which is usually possible on the server, a plurality of identical or similar vehicles, and thus different profiles, may be included in the check by the server.

DETAILED DESCRIPTION OF EXAMPLE EMBODIMENTS

Figure 1:
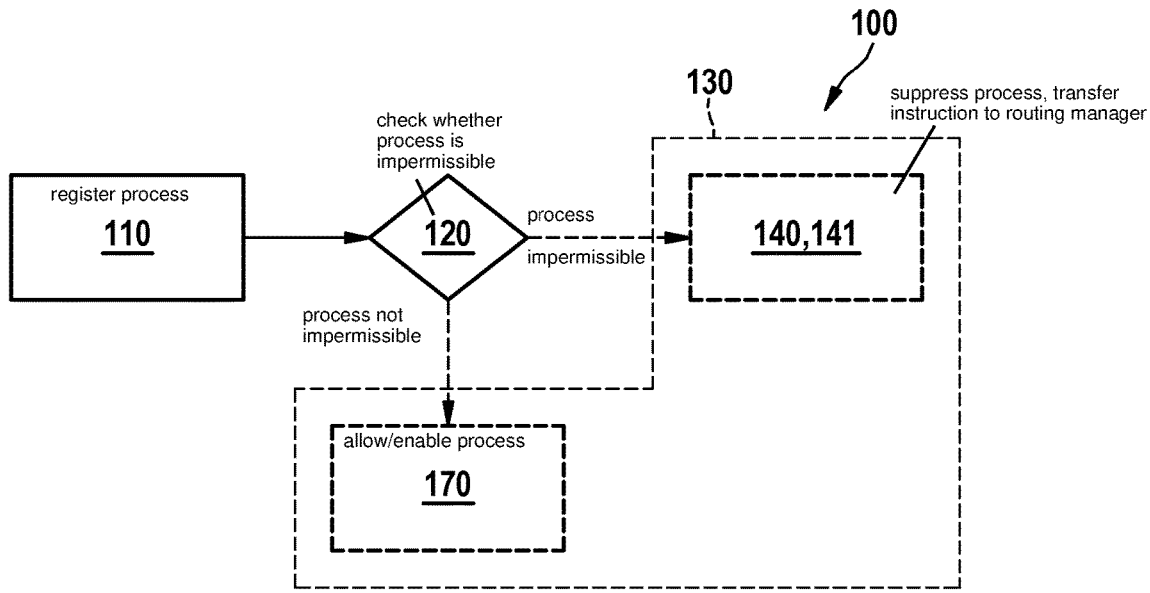
FIG. 1 schematically illustrates a computer-implemented method for recognizing and/or preventing an intrusion into a service-oriented communication system of a vehicle, according to an example embodiment of the present invention.

The computer-implemented method 100 is directed at the recognition and/or prevention of an intrusion into a service-oriented communication system 200 of a vehicle. In this way, the security is to be increased, or the security is also to be ensured with an increasingly larger attack surface in the vehicle. In its specific embodiments, method 100 may also be generalized for one or a plurality of technical systems, which are not necessarily vehicles, but each encompass at least one service-oriented communication system (e.g., SOME/IP). For example, such a technical system may be a robot (e.g., without wheels).

Service-oriented communication system 200 may be a communication middleware SOME/IP. As an alternative, service-oriented communication system 200 may encompass a communication middleware SOME/IP.

A computer-implemented method 100 for recognizing and/or preventing an intrusion into a service-oriented communication system 200 of a vehicle is described. This means that method 100 may be a method for recognizing an intrusion into the service-oriented communication system of the vehicle. As an alternative or in addition, the method may be a method for preventing an intrusion into the service-oriented communication system of the vehicle. The method includes registering 110 a process originating from an instance in service-oriented communication system 200. The method furthermore includes checking 120, at least based on a predetermined negative list NL, whether the process in service-oriented communication system 200 is impermissible. Checking 120 may, for example, be carried out in an intrusion recognition system (intrusion detection and prevention system, IDP), it being possible for intrusion detection and prevention system IDP to be a software and/or hardware unit. The predetermination of negative list NL (also referred to as "black list") means that negative list NL is predetermined at the point of time of check 120. The predetermination of negative list NL does not preclude negative list NL from, e.g., being updated via an interface 220 of service-oriented communication system 200.

Method 100 may furthermore include initiating 130 at least one measure at least as a function of a result of check 120. In addition, initiation 130 of the at least one measure may take place based on a predetermined measure algorithm. The predetermination of the measure algorithm means that the measure algorithm is predetermined at the point in time the at least one measure is initiated 130. The measure algorithm may also be updated via, e.g., interface 220 of service-oriented communication system 200. In this way, a response strategy (response policy, RP) may be dynamically implemented and adapted.

Initiating 130 the at least one measure may encompass suppressing 140 the process when check 120 has shown that the process is impermissible. Suppression 140 of the process may be at least temporary or permanent. As a result of suppressing 140 the process, it may be prevented that the process is further processed, e.g., executed. In this way, an intrusion and a potential damage may be prevented. Suppressing 140 the process may encompass transferring 141 at least one instruction to a routing manager RM of service-oriented communication system 200, which is designed to suppress 140 the process and/or to suppress future process originating from the instance of the process.

For example, routing manager RM may track which instances offer data, and to where data are to be transferred, i.e., which instances are to receive these data. For example, an instance may offer a service during the run time, i.e., dynamically, by providing a service id and an instance id to routing manager RM. Routing manager RM may then announce the offered service to all instances in the service-oriented communication system.

The process may, for example, encompass or be an inquiry to publish a service of the instance in service-oriented communication system 200. The process may, for example, also encompass or be an inquiry to retrieve (subscribe to) a service of at least one further instance of service-oriented communication system 200. The process may, in particular, be an inquiry to routing manager RM of service-oriented communication system 200. In the context of SOME/IP (in the present versions), the process is always an inquiry to the routing manager since this is the only option of interacting with the SOME/IP middleware.

As an alternative or in addition, initiating 130 the at least one measure may encompass prompting 150 an update of the predetermined negative list NL. In the process, a predetermined negative list NL may then be generated again. Prompting 150 may, for example, be an instruction to update module U of service-oriented communication system 200 to download a predetermined negative list NL from a server via interface 220 of service-oriented communication system 200. As an alternative or in addition, an update of the predetermined negative list NL may also be triggered by other events and/or conditions. For example, it may be checked during each start-up of the vehicle, when parking the vehicle and/or at regular intervals whether a current predetermined negative list NL may be downloaded from the server, which then replaces the existing predetermined negative list NL. As an alternative or in addition, an update of negative list NL may, for example, be triggered or required by the server, e.g., when the response strategy has changed. As an alternative, the predetermined negative list NL may also be updated by an incremental update which is downloaded from the server.

Initiating 130 the at least one measure may furthermore encompass verifying 151 the updated predetermined negative list NL. In this way, for example, the authenticity and/or integrity of the received data (here: the updated negative list NL) may be verified via a digital signature. In this way, it may be ensured that the data come from the correct sender and/or have not been manipulated. Verifying 151 may, for example, take place in a verification module RT of service-oriented communication system 200. Initiating 130 the at least one measure may furthermore encompass: rechecking 152, based on the updated predetermined negative list NL, whether the process in service-oriented communication system 200 is impermissible.

As an alternative or in addition, initiating 130 the at least one measure may encompass transferring 160 at least the process to a server outside of service-oriented communication system 200.

Initiating 130 the at least one measure may furthermore encompass: checking 161 outside of service-oriented communication system 200 whether the process in service-oriented communication system 200 is impermissible. Checking 161 outside of service-oriented communication system 200 may be based on a further predetermined negative list NL and/or a predetermined positive list. For example, applications which were expressly legitimized ("golden references") may be cited on the predetermined positive list. Checking 161 outside of service-oriented communication system 200 and, in particular, outside of the vehicle, may, in particular, be advantageous insofar as the server may have more computing power and more memory capacity. In this way, for example, a more detailed check, e.g., a deeper anomaly recognition based on deep artificial neural networks may be carried out. Moreover, large databases, e.g., including various profiles and/or application cases, may be stored in the larger memory. In this way, identical and/or similar vehicles in a fleet in the field may be included in check 161.

Initiating 130 the at least one measure may furthermore encompass receiving 162 the result of check 161 from the server. As an alternative or in addition, initiating 130 the at least one measure may encompass receiving 162 at least one further measure (or the predetermined measure algorithm) from the server. As an alternative or in addition, initiating 130 the at least one measure may encompass verifying 163 the result and/or the at least one further measure. In this way, for example, the authenticity and/or integrity of the received data (here: the result of check 161 and/or the at least one measure) may be verified via a (further) digital signature. In this way, it may be ensured that the data come from the correct sender and/or have not been manipulated. Verifying 163 may, for example, take place in verification module RT of service-oriented communication system 200.

Transferring 160 and receiving 162 may, for example, take place via interface 220 of service-oriented communication system 200.

As an alternative or in addition, initiating 130 the at least one measure may encompass a more detailed check, which, for example, necessitates a greater computing time, in the vehicle. A more detailed check, be it outside of or in the vehicle, may also be a check as to whether it is possible to confirm the results of check 120.

Initiating 130 the at least one measure may encompass: allowing 170 (or enabling) the process when check 120, 152, 161 has shown that the process is not impermissible (and thus permissible).

Initiating 130 the at least one measure may furthermore encompass measures which are directed at fending off the intrusion, at eliminating/deactivating the intruding instance of the service-oriented communication system and/or at documenting (logging) the intrusion and the intruding instance. Logged data may advantageously be used in future assessments.

FIG. 1 schematically shows a (minimal) specific embodiment of method 100 for recognizing and/or preventing an intrusion into service-oriented communication system 200 of the vehicle.

Initially, a process originating from an instance is registered 110 in service-oriented communication system 200. Thereafter, it is checked 120, at least based on the predetermined negative list NL, whether the process in service-oriented communication system 200 is impermissible. In this case, the process may be suppressed 140. Otherwise, when the process is not considered to be impermissible, the process is allowed 170.

Figure 2:
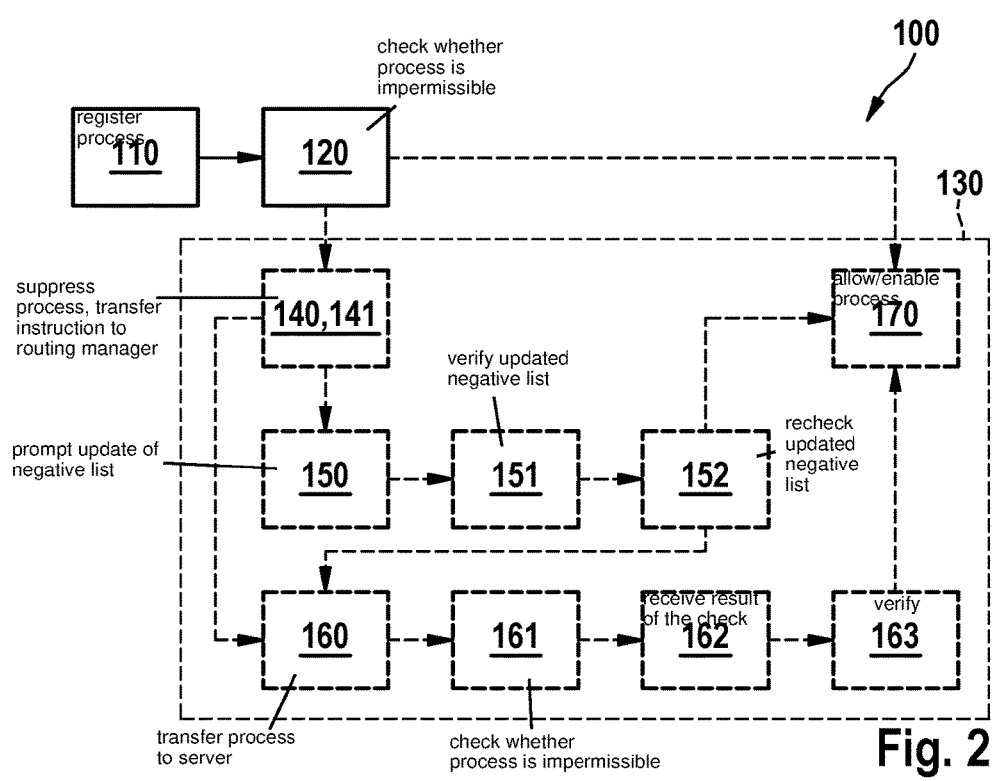
FIG. 2 schematically illustrates specific embodiments of the computer-implemented method for recognizing and/or assessing an intrusion into an electronic data system of a vehicle, according to the present invention.

FIG. 2 schematically shows various specific embodiments of method 100 for recognizing and/or preventing an intrusion into service-oriented communication system 200 of the vehicle. In the event that, in step 120, a process was assessed as impermissible, the process may be suppressed 140. Then, for example, initially the predetermined negative list NL may be updated, e.g., via steps/measures 150 and 151, and thereafter, in step/in measure 152, it may be checked again, based on the now updated negative list NL, whether the process is impermissible. If this is the case, the process does not necessarily have to be suppressed again since the process was already suppressed in step/in measure 140. Otherwise, when the process, based on the updated negative list NL, is not considered to be impermissible, the process may be allowed/enabled in step/in measure 170.

As an alternative or in addition to the update of the predetermined negative list NL, e.g., in steps/measures 150, 151, 152, (after step 140) the check, e.g., in steps/measures 160, 161, 162, 163, may take place outside of the service-oriented communication system. If the process, during this check 161, is again assessed as impermissible, the process does not necessarily have to be suppressed again since the process was already suppressed in step/in measure 140. Otherwise, when the process, based on the outsourced check 161, is considered to be not impermissible, the process may be allowed/enabled in step/in measure 170.

As an alternative or in addition to the update of the predetermined negative list NL and/or the outsourced check 161, a more detailed check, which, for example, necessitates a greater computing time, may take place in the vehicle (not shown in FIG. 2). If it results during this check that the process is not impermissible (or permissible), the process may be allowed/enabled in step/in measure 170.

The predetermined negative list NL may encompass a plurality of criteria. The criteria may, for example, be rules and/or conditions. As an alternative or in addition, a criterion may also be a check algorithm; see below. The plurality of criteria may, for example, encompass at least one criterion or more than 2, more than 5, more than 10, more than 20, more than 50, more than 1e2, more than 1e3, or more than 1e4 criteria. For example, the plurality of criteria may be a list of criteria which are independent of one another. As an alternative, the plurality of criteria may be a hierarchy or a tree of criteria. In this case, the criteria of the plurality are checked in a predefined order/logic.

The process in service-oriented communication system 200 may be assessed as impermissible during check 120, 152, 161 when at least one criterion of the plurality of the criteria is met, at least with respect to the process. As an alternative, the process may be assessed as impermissible when the hierarchy or the tree of criteria is met with respect to the process as a whole.

For example, at least one criterion of the plurality of the criteria may be designed so that a certain service is impermissible in service-oriented communication system 200, for example in a certain vehicle model. In other words, the at least one criterion in this case is met when the certain service is impermissible in the service-oriented communication system.

As an alternative or in addition, for example, at least one criterion of the plurality of the criteria may be designed so that it is impermissible for a certain instance to offer a certain service in service-oriented communication system 200.

As an alternative or in addition, for example, at least one criterion of the plurality of the criteria may be designed so that it is impermissible for a certain instance of service-oriented communication system 200 to retrieve a certain service.

As an alternative or in addition, for example, at least one criterion of the plurality of the criteria may be designed that it is impermissible for a certain instance to exceed a maximum permitted number of services of the instance.

As an alternative or in addition, for example, at least one criterion of the plurality of the criteria may be designed that a process is impermissible when at least one specific feature is activated or deactivated.

The predetermined negative list NL may encompass at least one check algorithm. In this case, the process in service-oriented communication system 200 may be assessed as impermissible during check 120, 152, 161 when the at least one check algorithm is at least applied to one process and, during execution and/or at the end of the at least one check algorithm, at least one further criterion is met. During execution and/or at the end, the at least one check algorithm may initiate 130 at least one measure (see above) in service-oriented communication system 200 (e.g., via a further output parameter of the at least one check algorithm). A predetermined negative list NL including at least one check algorithm may be referred to as a smart negative list (smart black list). For example, an entry in a smart negative list may effectuate that, whenever a third-party application or a new, previously unknown mobile communication device connects to the multimedia device of the vehicle, all services which are offered and/or retrieved by the third-party application or the new mobile communication device are blocked for a certain period and securely logged. The logged data may then, for example, be transferred to the server and be analyzed. If necessary, they may then be allowed 170 following a thorough check.

Furthermore, a service-oriented communication system 200 in a vehicle is described, which (i.e., service-oriented communication system 200) is designed to apply method 100 for recognizing and/or preventing an intrusion into service-oriented communication system 200. Service-oriented communication system 200 may thus be designed to apply method 100 for recognizing an intrusion into service-oriented communication system 200. As an alternative or in addition, service-oriented communication system 200 may be designed to apply method 100 for preventing an intrusion into service-oriented communication system 200. Communication system 200 may be safeguarded with the aid of method 100 for recognizing and/or preventing an intrusion into service-oriented communication system 200.

Figure 3:
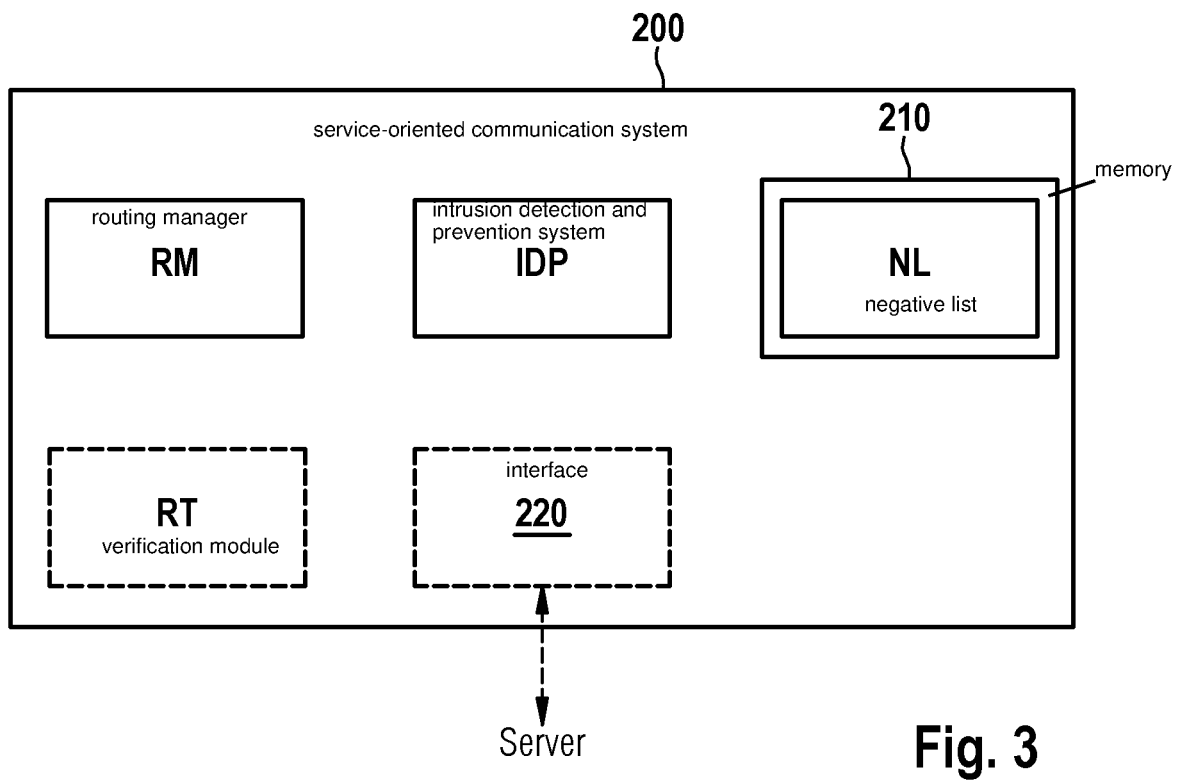
FIG. 3 schematically illustrates a service-oriented communication system in a vehicle, which is designed to apply the method for recognizing and/or preventing an intrusion into the service-oriented communication system, according to an example embodiment of the present invention.

As is schematically illustrated in FIG. 3, (service-oriented) communication system 200 may include a routing manager RM. Furthermore, communication system 200 may include an intrusion detection and prevention system IDP, intrusion detection and prevention system (as the English abbreviation IDP suggests) also being designed to initiate at least one measure (130), which, e.g., prevents the intrusion into communication system 200. Furthermore, communication system 200 may include a memory 210 including a predetermined negative list NL. Memory 210 may, for example, be a volatile memory or a non-volatile memory. In the case of a non-volatile memory, for example, a predetermined negative list NL may be permanently stored as standard (by default) and thus be retrievable. In the case of a volatile memory, for example, the predetermined negative list NL may be retrieved from a server and stored in the volatile memory. Prior to check 120, 152, 161, the predetermined negative list may be read out of the memory.

Routing manager RM may be designed to have every process checked 120, 152, 161 by intrusion detection and prevention system IDP with respect to an intrusion into service-oriented communication system 200 and based on the predetermined negative list NL, before the respective process is further processed by routing manager RM. This does not mean that the respective process is further processed in every case by routing manager RM (after check 120, 152, 161). Rather, the key is that initially the further processing of the respective process is suppressed 140, so that check 120, 152, 161 may take place, without the respective process already being further processed. In this way, an intrusion into service-oriented communication system 200 and thus a potential damage may be prevented. Whether the respective process is being further processed may, for example, depend on the result of check 120, 152, 161. The diversion of process from routing manager RM to intrusion detection and prevention system IDP may, for example, be implemented by a firmware update of an already existing routing manager RM. As a result of such an adaptation, a service-oriented architecture (SOA) may be provided.

Furthermore, routing manager RM or intrusion detection and prevention system IDP may be designed to initiate 130 at least one measure at least as a function of a result of check 120, 152, 161 and, optionally, based on a predetermined measure algorithm. The at least one measure may, for example, be directed at suppressing 140 the intrusion, and possibly any further intrusion of this kind.

Furthermore, routing manager RM may be designed to further process the respective process when the result of check 120, 152, 161 has assessed it as not impermissible (i.e., as permissible).

Communication system 200 may include an interface 220 for the communication of communication system 200 with a server (e.g., in a cloud, as a backend) outside of service-oriented communication system 200. Via interface 220, for example, data may be sent from communication system 200 to the server and/or from the server to communication system 200. The exchange of data may be safeguarded via end-to-end encryption. Via interface 220, for example, the predetermined negative list NL may be updated. Interface 220 may, for example, furthermore be utilized to check 161 the respective process outside of service-oriented communication system 200. Furthermore, interface 220 may, for example, be utilized to update the predetermined measure algorithm, which may, for example, also be stored in memory 210. In this way, a variable response strategy (response policy, RP) may be implemented. Interface 220 may be a radio interface, e.g., via a mobile communication network, 4G, 5G, 6G, WLAN, etc., which enables updates and interactions with communication system 200 during operation of the vehicle, i.e., typically in the field (over the air, OTA). Interface 220 contributes to the dynamic variability of the service-oriented communication system.

Furthermore, communication system 200 may include a verification module (root-of-trust module, RT), which is designed to verify 151, 163 data received from the server. The verification may, for example, take place via digital certificates. It may be directed at checking the authenticity and/or integrity of the received data. Communication system 200 may furthermore include an update module (U), which is designed to control updates via interface 220.

Figure 4:
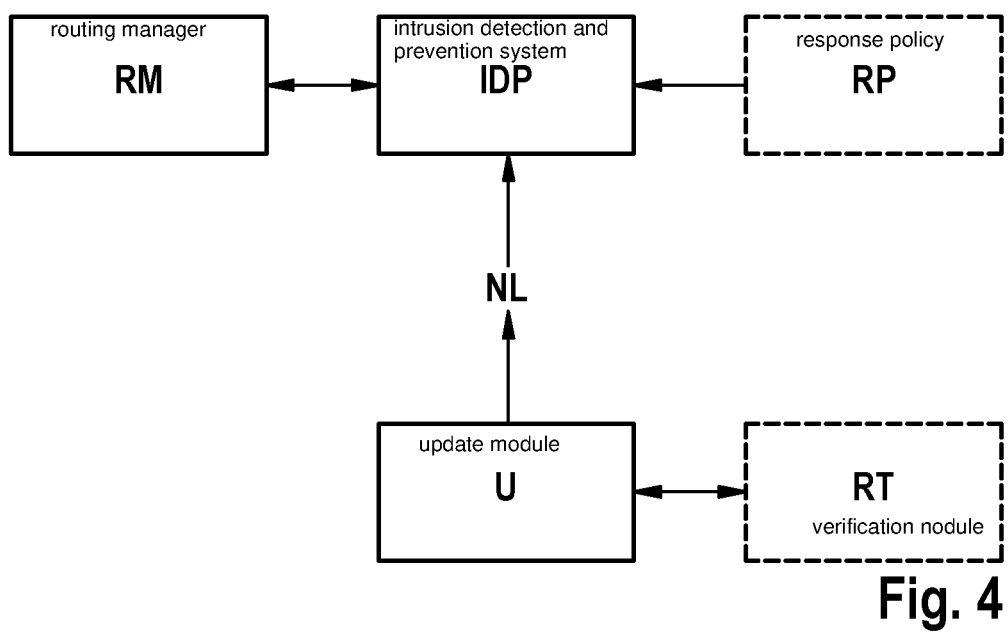
FIG. 4 schematically illustrates specific example embodiments of the computer-implemented method for recognizing and/or assessing an intrusion into an electronic data system of a vehicle based on features of the service-oriented communication system, according to the present invention.

Routing manager RM, intrusion detection and prevention system IDP, root-of-trust RT and update module U may each be implemented by a software unit and/or a hardware unit in communication system 200. One service-oriented communication system in a vehicle is schematically illustrated in FIG. 3. FIG. 4 schematically illustrates specific embodiments of the computer-implemented method for recognizing and/or assessing an intrusion into an electronic data system of a vehicle based on features of the service-oriented communication system.

Furthermore, a vehicle is described, which includes a service-oriented communication system 200, which is designed to apply method 100 for recognizing and/or preventing an intrusion into service-oriented communication system 200. The vehicle may be safeguarded with the aid of method 100 for recognizing and/or preventing an intrusion into service-oriented communication system 200, at least with respect to the service-oriented communication system.

Furthermore, a computer program is described, which is designed to carry out the computer-implemented method 100 for recognizing and/or preventing an intrusion into a service-oriented communication system 200. The computer program may be present, e.g., in interpretable form or in compiled form. It may be loaded (even in parts) into the RAM of a control unit or computer, e.g., as a bit or byte sequence, for execution, it also being possible for a computer to act as a server.

Furthermore, a computer-readable medium or signal is described, which stores and/or contains the computer program. The medium may, e.g., encompass one of RAM, ROM, EPROM, etc., on/in which the signal is stored.

Furthermore, a computer system is described, which is designed to execute the computer program. The computer system may, in particular, include at least one processor and at least one working memory. Furthermore, the computer system may include a memory. The computer system may extend via a system out of the vehicle, and optionally the server.

What is claimed is:

1. A computer-implemented method for recognizing and/or preventing an intrusion into a service-oriented communication system of a vehicle, comprising the following steps:
    registering a process originating from an instance in the service-oriented communication system;
    checking, at least based on a predetermined negative list, whether the process in the service-oriented communication system is impermissible, wherein the predetermined negative list includes a hierarchy of criteria, and the process in the service-oriented communication system is assessed as impermissible during the check when at least one criterion of the hierarchy of criteria is met with respect to the process; and
    in response to the check indicating the process is impermissible:
        updating the predetermined negative list, the updating including using a radio interface to download an updated version of the predetermined negative list from a server outside of the vehicle via a wireless mobile communications network;
        rechecking, based on the updated predetermined negative list, whether the process in the service-oriented communication system is impermissible;
        determining, by the rechecking, that the process is not impermissible; and
        in response to the rechecking determining that the process is not impermissible, allowing the process.

2. The method as recited in claim 1, further comprising in response to the check indicating the process is impermissible;
    suppressing the process.

3. The method as recited in claim 1, further comprising in response to the check indicating the process is impermissible:
    verifying the updated version of the predetermined negative list; and again checking, based on the updated version of the predetermined negative list, whether the process in the service-oriented communication system is impermissible.

4. The method as recited in claim 1, further comprising in response to the check indicating the process is impermissible:
transferring at least the process to a server outside of the service-oriented communication system;
checking outside of the service-oriented communication system whether the process in the service-oriented communication system is impermissible;
receiving the result of the check from the server; and
verifying the result.

5. The method as recited in claim 1, wherein the predetermined negative list includes at least one check algorithm, and the process in the service-oriented communication system is assessed as impermissible during the check when the at least one check algorithm is applied at least to the process and, during execution and/or at an end of the at least one check algorithm, at least one further criterion is met.

6. The method as recited in claim 1, wherein the service-oriented communication system includes a scalable service-oriented middleware over Internet Protocol (IP) (SOME/IP).

7. The method as recited in claim 1, further comprising in response to the check indicating the process is impermissible:
transferring the process to a server outside of the service-oriented communication system.

8. A service-oriented communication system in a vehicle, configured to recognize and/or prevent an intrusion into the service-oriented communication system, the communication system configured to:
register a process originating from an instance in the service-oriented communication system;
check, at least based on a predetermined negative list, whether the process in the service-oriented communication system is impermissible, wherein the predetermined negative list includes a hierarchy of criteria, and the process in the service-oriented communication system is assessed as impermissible during the check when at least one criterion of the hierarchy of criteria is met with respect to the process; and
in response to the check indicating the process is impermissible:
update the predetermined negative list, the updating including using a radio interface to download an updated version of the predetermined negative list from a server outside of the vehicle via a wireless mobile communications network;
recheck, based on the updated predetermined negative list, whether the process in the service-oriented communication system is impermissible;
determine, by the rechecking, that the process is not impermissible; and
in response to the rechecking determining that the process is not impermissible, allow the process.

9. The communication system as recited in claim 8, comprising:
a routing manager;
an intrusion detection and prevention system;
a memory including the predetermined negative list;
wherein the routing manager is configured to:
have every process checked by the intrusion detection and prevention system with respect to an intrusion into the service-oriented communication system and based on the predetermined negative list, before the respective process is further processed by the routing manager; and
initiate the at least one measure at least as a function of a result of the check; and
further process each process when a result of the check has assessed it as not impermissible.

10. The communication system as recited in claim 8, further comprising:
an interface for communication of the communication system with a server outside of the service-oriented communication system; and
a root-of-trust module, which is configured to verify data received from the server.

* * * * *